Dec. 16, 1952  U. C. McMILLER  2,621,836
COVERED CARRIER ADAPTED TO BE MOUNTED ON AUTOMOBILE TOPS
Filed Feb. 3, 1950  2 SHEETS—SHEET 2
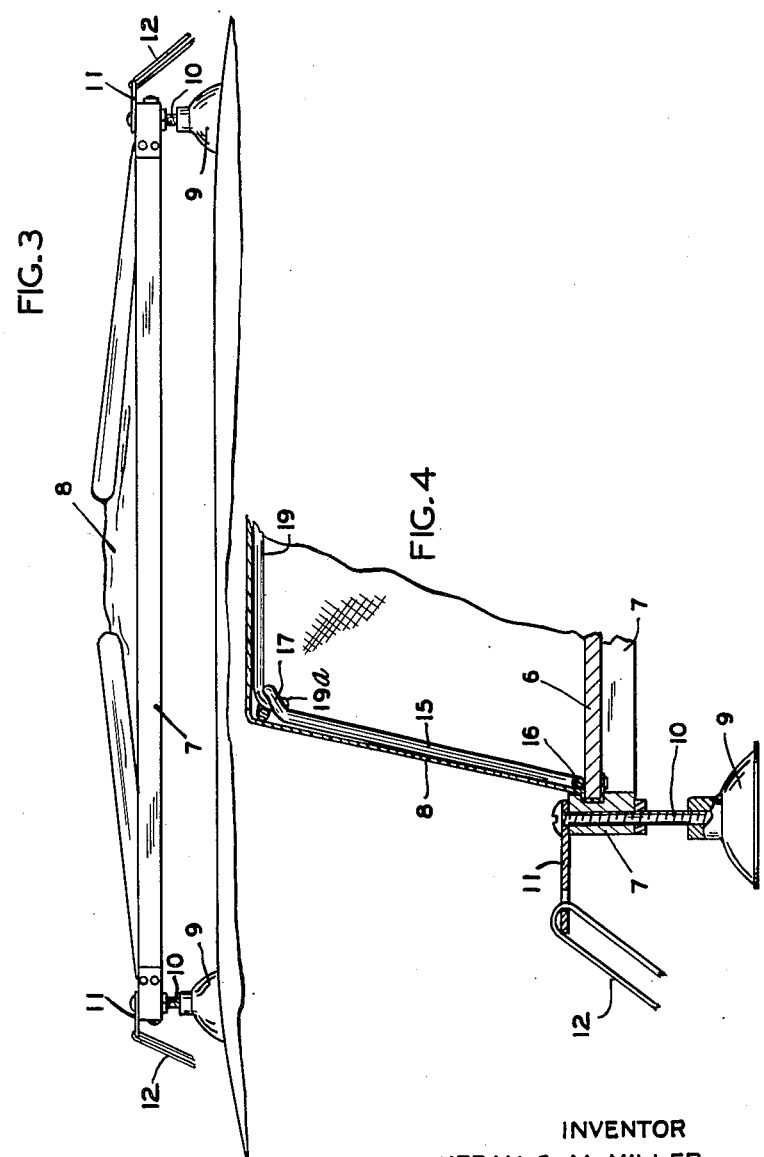
INVENTOR
URBAN C. McMILLER
BY
*Williamson & Williamson*
ATTORNEYS Patented Dec. 16, 1952

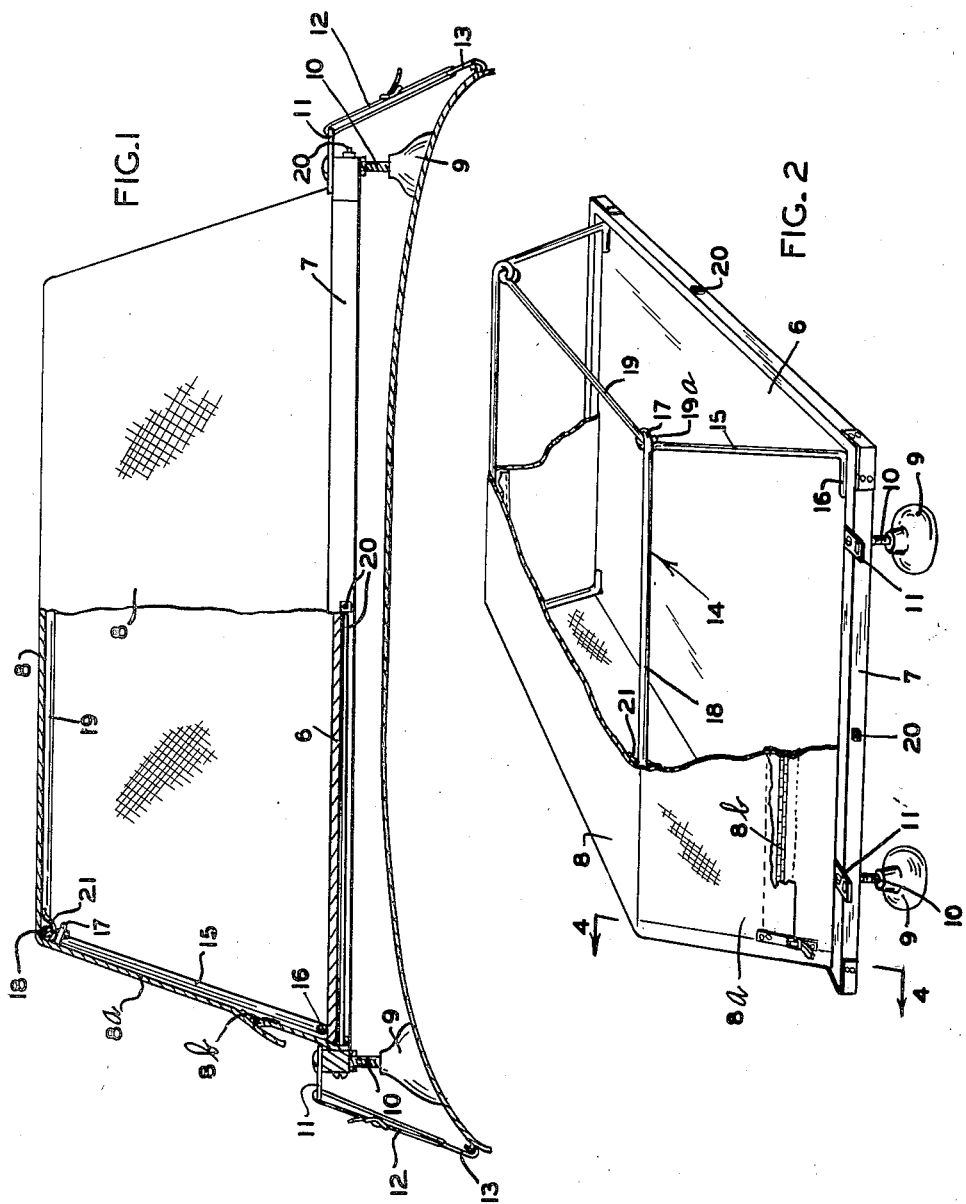

2,621,836

UNITED STATES PATENT OFFICE 2,621,836

COVERED CARRIER ADAPTED TO BE MOUNTED ON AUTOMOBILE TOPS

Urban C. McMiller, Minneapolis, Minn., assignor to Gerald D. Godwin, Minneapolis, Minn.

Application February 3, 1950, Serial No. 142,247

6 Claims. (Cl. 224—42.1)

This invention relates to covered carriers adapted to be secured to automobile tops.

This invention is an improvement over the structure shown in the United States Letters Patent granted to Gerald D. Godwin on May 4, 1948, and bearing the No. 2,440,821.

It is an object of my invention to provide a carrier for luggage and other articles, which is adapted to be mounted on the top of an automobile and is provided with a flexible cover having a side opening to permit easy access to the inside and has a collapsible frame designed to permit the cover to be flatly and compactly collapsed when not in use and to be quickly and easily erected to be put in operation.

More specifically, it is an object to provide a carrier having a flat substantially solid base adapted to be mounted on the top of an automobile and having a flexible cover connected to said base and adapted to extend upwardly therefrom with a frame constructed to support said cover in raised position when erected and adapted to be easily and quickly collapsed when not in use.

These and other objects and advantages of my invention will more fully appear from the following description made in connection with the accompanying drawings wherein like reference characters refer to the same or similar parts throughout the several views and in which:

Fig. 1 is a transverse vertical sectional view showing my improved luggage carrier mounted on an automobile top and showing a portion of the carrier in side elevation;

Fig. 2 is a perspective view of the carrier shown in Fig. 1 with a portion of the cover broken away;

Fig. 3 is a side elevational view of the carrier shown in collapsed position; and Fig. 4 is a fragmentary vertical sectional view taken substantially along the line 4—4 of Fig. 2.

As illustrated in the accompanying drawings, I provide a base platform designated by the numeral 6 and constructed of any substantially rigid material such as plywood. The outer edge portion of said base is reinforced by a peripheral molding strip 7 which is grooved on the inner side thereof to receive the base and the lower marginal peripheral edge portion of a flexible cover 8 which is securely fixed thereto as best shown in Fig. 4. Suitable carrier mounting means, such as the suction cups 9 are provided, and these cups are mounted on upstanding rods 10 which are securely anchored to the molding strip 7 as best shown in Figs. 2 and 4. Suitable strap receiving brackets 11 are fixed to the molding strip 7 as by the rods 10 and have an aperture in the outer portion thereof to respectively receive the anchoring straps 12 therethrough. These anchoring straps 12 and hooks 13 connected at the lower portion thereof permit attachment to the rain trough which is conventionally found on automobiles.

The flexible cover 8 has sloping side portions 9 and forms a frustum of a pyramid when in expanded position. A collapsible supporting structure for holding the cover 8 in raised position is provided which has a pair of side frames 14 each having the substantial shape of an inverted U and each having a pair of upstanding legs 15 with a supporting foot 16 fixed at the bottom thereof and an eye 17 fixed at the top thereof. A substantially horizontally disposed side supporting bar 18 extends between the eyes 17 of each frame 14 and is rigidly fixed thereto. In the form shown the frame 14 is made from a single integrally formed rod member bent to form the feet 16, eyes 17 and other elements thereof. A pair of cross rods 19 removably interconnect the frames 14 at the ends thereof. An eye is formed in one end of each of the cross rods 19 and these eyes are cooperatively received in the eyes 17 of one of the frames 14. The other end of each of the rods 19 has a hook 19a adapted to be removably received in the directly opposed eye 17 of the other frame 14.

The side of the cover 8 adjacent the hooks 19a has an opening formed therein with a flap 8a for closing the same. A suitable closure, such as the slide fastener 8b, is provided for closing the opening of the cover 8 and securely holds the flap 8a in closed position. A pair of cross rods 20 are mounted in the opposed central portions of the molding strips 7 and extend across under the platform 6 to reinforce the same. These rods, of course, are disposed at substantially right angles one with the other and cross at substantially the center of the platform 6.

The base platform 6 is preferably of one piece construction to provide more rigidity and when reinforced by rods 20 produces a highly stable and resistant load carrying deck. In the form shown the bars 18 of the frames 14 are respectively connected to the upper side edges of the cover 8 as by the flap elements 21. This connection permits oscillation of the bars 18 relative to the cover and permits the frames 14 to be collapsed toward the center of the base platform 6 as shown in Fig. 3. In the form shown the foot members 16 of the frames 14 are merely held in place by the attachment of the bars 18 at the top of the sides of the cover. This provides an extremely simple construction to manufacture and assemble. These feet provide the pivotal axes on which the frames 14 swing when they are collapsed and erected and securely support the frames when in erected position by pressure against the marginal edge portions of the base platform 6. Since the feet 16 of the frames 14 swing on a slightly different axis than the side panels of the cover it is necessary to provide for limited horizontal shifting movement of the bars 18 relative to the cover in order to prevent binding of the bars with the cover when the carrier is collapsed. This connection between the cover and the frames produces the desired stability and support of the canvas while permitting easy collapsing of the carrier unit. When the carrier is collapsed the rods 19 may be merely crossed at intermediate portions thereof and are completely confined within the collapsed cover. The sides and ends of the carrier slope inwardly toward the top so that the top of the cover 8 is substantially smaller in perimeter and area than is the base platform 6. This produces a highly rigid structure when the frames 14 are in erected locked position and securely holds the cover 8 in tightly stretched spaced relation above the platform 6. This frusto pyramidal shape also adds materially to the appearance of the carrier when in use and produces somewhat less wind resistance at high speeds.

The side opening permits easy access to the interior of the carrier and the frame and rod construction permits extremely quick and easy collapsing and erection of the carrier cover.

It will be seen that I have provided a covered luggage carrier adapted to be mounted on automobile tops, which has a relatively stable and rigid base platform 6 with an easily collapsible frame construction for supporting the flexible water-proof cover. The carrier is relatively simple and inexpensive to manufacture and assemble and is much easier to erect and collapse and is more accessible than are conventional carriers of the covered type.

It should be noted that the side frame members 14 when in erected position slope inwardly toward the top thereof and the plane of said frame members is disposed substantially adjacent to the plane of the side portion of the cover. This permits completely unobstructed access to the inside of the carrier through the side opening and provides a clear span under the cover to permit the entire covered volume to be used for the storage of luggage or other articles.

It will, of course, be understood that various changes may be made in the form, details, arrangement and proportions of the parts without departing from the scope of my invention.

What I claim is:

1. A covered carrier adapted for attachment to automobile tops, said carrier comprising an integrally formed quadrilateral base member, a flexible cover connected at its lower peripheral edge portion to said base member and shaped so that the sides thereof extend upwardly and inwardly from said base to form a frusto pyramidal shape when in erected position, said cover having an opening across one side thereof with a closure flap for closing said opening, means for holding said flap in closed position, a pair of side frame members underlying said cover, each frame member having a pair of foot members lying in the same plane as the major portion thereof and supported on the respective side corner portions of said base, at least one eye formed in the upper portions of each of said frames, and a cross frame structure having one end pivotally mounted in one of said eyes and having a hook element formed at the other end for releasable connection with the other of said eyes to form a supporting frame for holding said cover in erected position but permitting compact collapsing thereof.

2. The structure set forth in claim 1, with said hook element being disposed substantially adjacent said opening to permit easy accessibility thereof.

3. The structure set forth in claim 1, and said cross frame structure consisting in a pair of cross rods pivotally connected at one of their ends to the upper end portions of the frame member disposed remotely from said opening and each having a hook at the other ends thereof disposed adjacent said opening, at least said frame adjacent said opening having a pair of eyes formed at the ends of the upper portions thereof for releasable reception of said hook members.

4. A covered carrier adapted to be attached to automobile tops, said carrier comprising a substantially rigid integrally formed quadrilateral base member, a flexible cover connected at its lower peripheral edge portion to said base member and having the sides and ends thereof extending upwardly and inwardly from said base to form a frusto pyramidal shape when in erected position, a pair of end frames, each having a pair of upstanding supporting elements sloping inwardly toward the top with a substantially horizontal rigid bar interconnecting the upper ends of said upstanding elements to form a substantially inverted U-shaped frame pivotally supported on said base and when in erected position lying in a sloping plane disposed adjacent the plane of the sides of said cover and having the upper portion attached to the adjacent upper portion of said cover, means for releasably interconnecting the upper portions of said frames to form a collapsible supporting structure for said cover wherein substantially the entire volume under said cover is available for storage space, and means for attaching the carrier to the top of an automobile.

5. A covered carrier adapted to be attached to the top of an automobile, said carrier comprising a substantially rigid quadrilateral base member, a flexible cover connected at it lower peripheral edge portion to said base member and having the sides and ends thereof when in erected position extending upwardly and inwardly from said base to form a frusto pyramidal shape, a collapsible frame structure underlying said cover and comprising a pair of frame members having their bottom portions respectively supported on said base adjacent the connection between said base and said cover and, when in erected position, sloping upwardly and inwardly from said base to tightly stretch said cover, said cover securely holding the lower portions of said frame members in wedging engagement between said base and the connected portions of said cover, and means for releasably interconnecting only the upper portions of said two frame members to securely hold the same in erected position.

6. The structure set forth in claim 5 and an upstanding flange mounted on at least the side portions of said base adjacent the portions thereof engaged by the lower elements of said frame members to reinforce said portions and provide a rigid corner into which said frame members are securely and positively wedged by said cover when in tightly stretched erected position.

URBAN C. McMILLER.

REFERENCES CITED

The following references are of record in the file of this patent:

UNITED STATES PATENTS

| Number | Name | Date |
| --- | --- | --- |
| 255,488 | Burroughs | Mar. 28, 1882 |
| 943,525 | Drake | Dec. 14, 1909 |
| 968,028 | Brown | Aug. 23, 1910 |
| 1,958,169 | O'Neill | May 8, 1934 |
| 2,185,588 | Datz | Jan. 2, 1940 |
| 2,222,636 | Strauss | Nov. 26, 1940 |
| 2,440,821 | Godwin | May 4, 1948 |